US009366569B2

(12) United States Patent
Cho et al.

(10) Patent No.: US 9,366,569 B2
(45) Date of Patent: Jun. 14, 2016

(54) METHOD OF EVALUATING LUMINANCE OF LIGHT SOURCE AND LIGHTING APPARATUS INCLUDING THE LIGHT SOURCE (71) Applicant: LG INNOTEK CO., LTD., Seoul (KR)

(72) Inventors: Sung Wook Cho, Seoul (KR); Ki Hyun Kim, Seoul (KR); Eun Hwa Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 112 days.

(21) Appl. No.: 14/189,089

(22) Filed: Feb. 25, 2014

(65) Prior Publication Data
US 2014/0239150 A1 Aug. 28, 2014

(30) Foreign Application Priority Data

Feb. 28, 2013 (KR) ........................ 10-2013-0022277

(51) Int. Cl.
*G01J 1/44* (2006.01)
*F21K 99/00* (2016.01)
*G01J 1/42* (2006.01)

(52) U.S. Cl.
CPC ...... *G01J 1/44* (2013.01); *F21K 9/30* (2013.01); *G01J 1/42* (2013.01); *G01J 2001/4252* (2013.01)

(58) Field of Classification Search
CPC .................. F21K 9/30; G01J 1/42; G01J 1/44; G01J 2001/4252
See application file for complete search history.

(56) References Cited

U.S. PATENT DOCUMENTS

| 7,766,528 | B2 * | 8/2010 | Epstein ............ G02F 1/133604 362/231 |
| 2007/0081339 | A1 | 4/2007 | Chung et al. .................. 362/294 |
| 2011/0037736 | A1 | 2/2011 | Epstein et al. ................ 345/204 |

FOREIGN PATENT DOCUMENTS

| CN | 202 100 999 U | 1/2012 |
| JP | 2008-180842 A | 8/2008 |
| KR | 10-2010-0042593 A | 4/2010 |
| WO | WO 2012/015013 A1 | 2/2012 |

OTHER PUBLICATIONS

European Search Report dated Aug. 18, 2014 issued in Application No. 14 156 383.3.
Zong Qin et al: "Analysis of Light Emitting Diode Array Lighting System Based on Human Vision; Normal and Abnormal Uniformity Condition"; Optics Express; vol. 20, No. 21; Oct. 8, 2012; pp. 23927-23943 (XP 055118458).
Partial European Search Report dated May 27, 2014 issued in Application No. 14156383.3.

* cited by examiner

*Primary Examiner* — Francis M Legasse, Jr.
(74) *Attorney, Agent, or Firm* — KED & Associates, LLP (57) ABSTRACT

Embodiments provide a method of evaluating luminance of a light source, including acquiring first data including a plurality of luminance values by measuring luminance of the light source, converting the first data into second data corresponding to a plurality of unit cells, acquiring a moving average of the second data, and acquiring a ripple factor. The ripple factor is represented by $(D_{raw}-M_a)/M_a$, where $D_{raw}$ is the second data and $M_a$ is the moving average.

20 Claims, 14 Drawing Sheets

METHOD OF EVALUATING LUMINANCE OF LIGHT SOURCE AND LIGHTING APPARATUS INCLUDING THE LIGHT SOURCE

CROSS REFERENCE TO RELATED APPLICATION

This application claims priority under 35 U.S.C. §119 to Korean Patent Application No. 10-2013-0022277, filed in Korea on Feb. 28, 2013, which is hereby incorporated in its entirety by reference as if fully set forth herein.

BACKGROUND

1. Field

Embodiments relate to a method of evaluating luminance of a light source and a lighting apparatus.

2. Background

Group III-V compound semiconductors, such as GaN, AlGaN, etc., are widely used for optoelectronics and electronics because of several advantages, such as, for example, easily controllable wide band gap energy.

In particular, light emitting devices, such as Light Emitting Diodes (LEDs) or Laser Diodes (LDs), which use group III-V or group II-VI compound semiconductors, are capable of emitting visible and ultraviolet light of various colors, such as red, green, and blue, owing to development of device materials and thin film growth techniques. Moreover, these light emitting devices are capable of emitting white light with high luminous efficacy through use of a fluorescent substance or color combination, and have advantages of low power consumption, semi-permanent lifespan, fast response time, safety and environmental friendliness as compared to conventional light sources, such as fluorescent lamps, incandescent lamps, etc.

Accordingly, application sectors of light emitting devices are expanded up to transmitting modules of optical communication means, LED backlights to replace Cold Cathode Fluorescence Lamps (CCFLs) which serve as backlights of Liquid Crystal Display (LCD) apparatuses, white LED lighting apparatuses to replace fluorescent lamps or incandescent lamps, head lights of vehicles and traffic lights.

Lighting apparatuses or car headlamps may include a light emitting device package in which a plurality of light emitting devices is disposed in a single unit.

Luminance is an important factor in terms of product characteristics of lighting apparatuses or headlamps. In particular, there is increasing needs for lighting apparatuses or headlamps having good luminance uniformity.

Currently, minimum and maximum values of luminance data are utilized as criteria of luminance uniformity of lighting apparatuses, for example. However, the aforementioned minimum and maximum values of luminance data indicate only minimum and maximum values of luminance in each area of a single lighting apparatus, and do not indicate the average of the entire lighting apparatus.

In addition, a deviation of each area with respect to the average luminance of the entire lighting apparatus is an important factor to determine luminance uniformity, but may not be represented using only minimum and maximum values of luminance in each area.

Moreover, the lighting apparatus has lower luminance in an edge area thereof than that in a central area thereof, which may have an effect on the above-described minimum value of luminance in each area.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIGS. 8A to 12A show luminance distribution before data measurement of Example 1 to Example 5, and FIGS. 8B to 12B show measured luminance distribution data, moving average (red), and ripple factor of Example 1 to Example 5.

DETAILED DESCRIPTION

Hereinafter, embodiments will be described in detail with reference to the annexed drawings for better understanding.

In the following description of the embodiments, it will be understood that, when each element is referred to as being formed "on" or "under" the other element, one element can be directly "on" or "under" the other element or the two elements can be indirectly formed with intervening one or more other elements therebetween. Also, it will also be understood that "on" or "under" one element may contain the meaning of upward or downward on the basis of the element.

Figure 1:
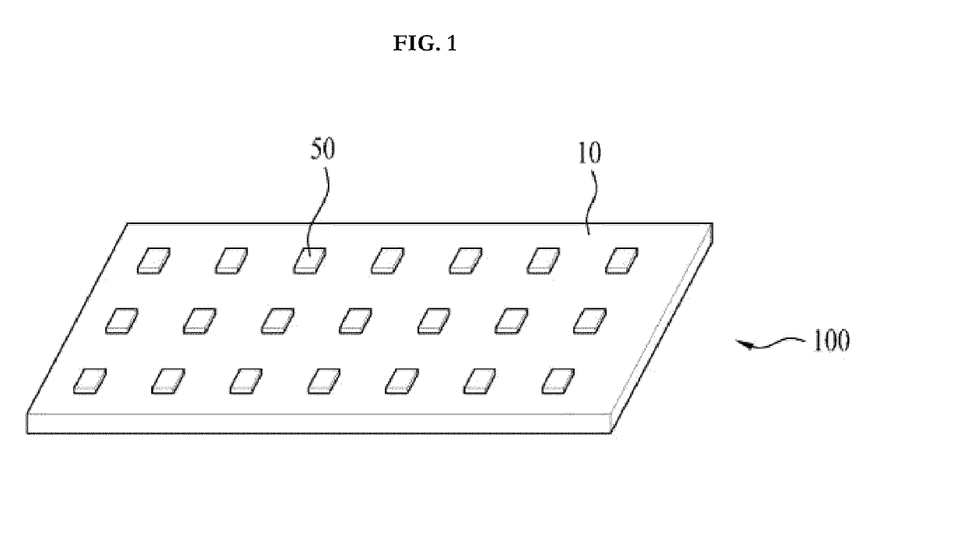
FIG. 1 is a view showing arrangement of light emitting devices included in a light source.

FIG. 1 is a view showing arrangement of light emitting devices included in a light source.

A light source 100 may be a lighting apparatus or a car headlamp, for example, and include a plurality of light emitting devices 50 disposed on a board 10.

The light emitting devices 50 may be light emitting diodes, and the board 10 may be a printed circuit board capable of supplying current to the light emitting devices 50.

The light emitting devices 50 may be vertical type light emitting devices, horizontal type light emitting devices, or flip chip type light emitting devices.

Each of the light emitting devices 50 may include a light emitting structure comprised of a first conductive semiconductor layer, an active layer, and a second conductive semiconductor layer.

The first conductive semiconductor layer may be formed of group III-V or II-VI compound semiconductors, and may be doped with a first conductive dopant. For example, the first conductive semiconductor layer may be formed of any one or more materials selected from among semiconductor materials having a composition equation of $Al_xIn_yGa_{(1-x-y)}N$ (0<x<1, 0<y<1, 0<x+y<1) as well as AlGaN, GaN, InAlGaN, AlGaAs, GaP, GaAs, GaAsP, and AlGaInP.

When the first conductive semiconductor layer is an n-type semiconductor layer, the first conductive dopant may be an n-type dopant including Si, Ge, Sn, Se, Te, etc. The first conductive semiconductor layer may be formed in a single layer or in multiple layers, but is not limited thereto.

When the light emitting devices are ultraviolet (UV), deep UV, or nonpolar light emitting devices, the first conductive semiconductor layer may contain at least one of InAlGaN and AlGaN.

The active layer may be interposed between the first conductive semiconductor layer and the second conductive semiconductor layer, and may include any one of a single well structure, a multi well structure, a single quantum well structure, a multi quantum well structure, a quantum dot structure, and a quantum line structure.

The active layer may be formed of group III-V compound semiconductors, and include a well layer and a barrier layer having a pair structure of any one or more of AlGaN/AlGaN, InGaN/GaN, InGaN/InGaN, GaN/AlGaN, InAlGaN/GaN, GaAs(InGaAs)/AlGaAs, and GaP(InGaP)/AlGaP, but is not limited thereto. The well layer may be formed of a material having a smaller energy band gap than an energy band gap of the barrier layer.

The second conductive semiconductor layer may be formed of semiconductor compounds. That is, the second conductive semiconductor layer may be formed of group III-V or II-VI compound semiconductors, and may be doped with a second conductive dopant. For example, the second conductive semiconductor layer may be formed of any one or more materials selected from among semiconductor materials having a composition equation of $In_xAl_yGa_{1-x-y}N$ ($0 \leq x \leq 1$, $0 \leq y \leq 1$, $0 \leq x+y \leq 1$) as well as AlGaN, GaN, AlInN, AlGaAs, GaP, GaAs, GaAsP, and AlGaInP.

When the second conductive semiconductor layer is a p-type semiconductor layer, the second conductive dopant may be a p-type dopant including Mg, Zn, Ca, Sr, Ba, etc. The second conductive semiconductor layer may be formed in a single layer or in multiple layers, but is not limited thereto. When the light emitting devices are ultraviolet (UV), deep UV, or nonpolar light emitting devices, the second conductive semiconductor layer may include at least one of InAlGaN and AlGaN.

The first conductive semiconductor layer has a roughened surface to enhance light extraction efficiency of the light emitting devices.

The above-described light emitting devices 50 may be vertically and horizontally disposed in rows and columns in parallel to one another over the board 10, but distances between the rows and between the columns may be different. Alternatively, the light emitting devices 50 may have random arrangement.

Figure 2:
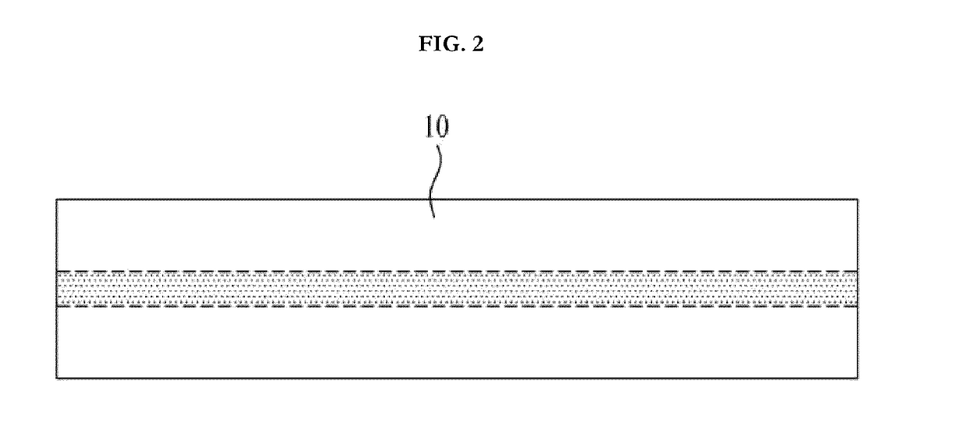
FIG. 2 is a view showing an area corresponding to first data of the light source of FIG. 1.

FIG. 2 is a view showing an area corresponding to first data of the light source of FIG. 1. As exemplarily shown, when measuring luminance of light emitted from the plural light emitting devices 50 disposed on the board 10 to measure and evaluate luminance of the light source, luminance of light emitted from a central area of the board 10 may be measured to acquire first data.

Figure 3:
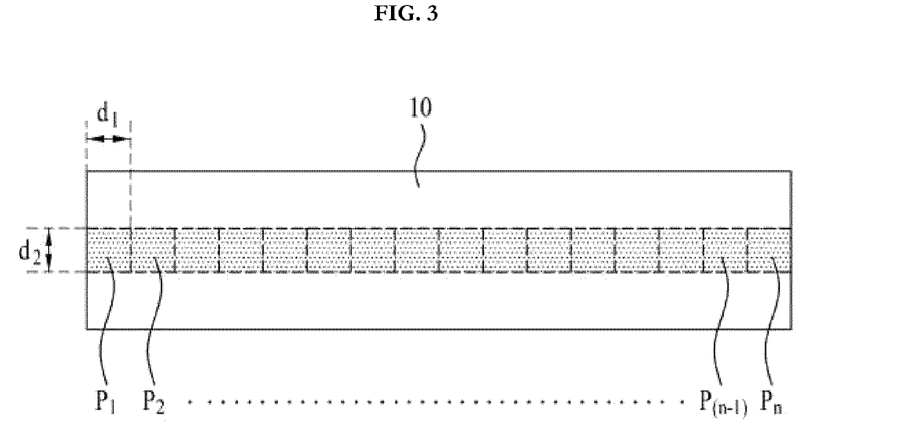
FIG. 3 is a view showing arrangement of the first data shown in FIG. 2.

FIG. 3 is a view showing arrangement of the first data of FIG. 2.

In FIG. 2, the first data is acquired by measuring luminance of the central area of the board 10. The first data, as exemplarily shown in FIG. 3, may include luminance values corresponding to a total of n cells $P_1, P_2, \ldots, P_{(n-1)}, P_n$.

Both a horizontal length $d_1$ and a vertical length $d_2$ of each of the cells $P_1, P_2, \ldots, P_{(n-1)}, P_n$ may be 3 mm. Measurement of luminance of each of the cells $P_1, P_2, \ldots, P_{(n-1)}, P_n$ may include detection of average luminance of each of the cells $P_1, P_2, \ldots, P_{(n-1)}, P_n$ using a luminance measurement unit, such as a camera, etc.

Figure 4:
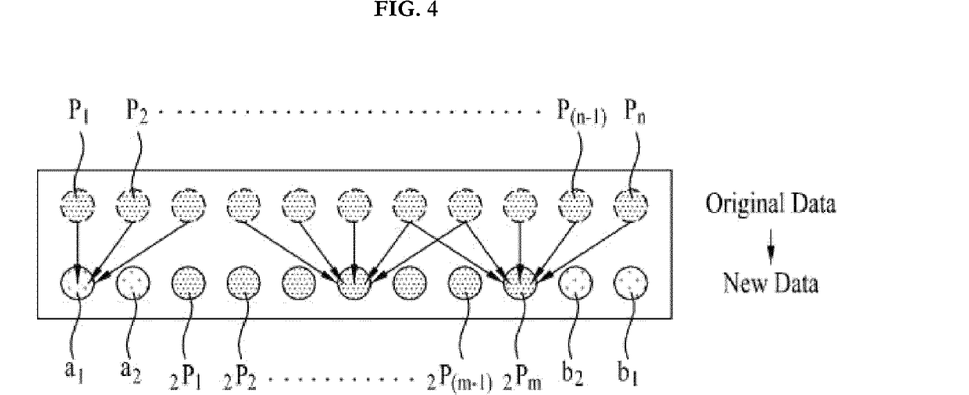
FIG. 4 is a view showing acquisition of second data from the first data.

FIG. 4 is a view showing acquisition of second data from the first data.

When the board 10 has a large size and the number of the light emitting devices 50 is very great, there may be a significantly great amount of data with regard to FIGS. 2 and 3. In addition, due to the fact that an edge area has lower luminance, the resulting luminance value may be excluded from luminance evaluation because it may have an effect on the minimum value of luminance in each area.

In FIG. 4, the first data is converted into second data corresponding to a plurality of unit cells. The luminance values of the first data corresponding to the plural neighboring cells may be averaged, and the resulting average values may be set to second data corresponding to the unit cells.

Specifically, in FIG. 4, an average value of luminance values of five neighboring cells (original data) may be converted into and set to a luminance value corresponding to a new single unit cell (new data). The original data before conversion may be the first data, and the new data after conversion may be the second data.

In FIG. 4, the second data may correspond to unit cells $a_1$, $a_2$, $_2P_1$, $_2P_2$, $\ldots$, $_2P_{(m-1)}$, $_2P_m$, $b_2$, $b_1$ from the left. With regard to the above-described first data, 'n' may be a positive integer, and with regard to the second data, 'm' may be a positive integer less than 'n'.

More specifically, the second data corresponding to the unit cells $_2P_1$, $_2P_2$, $\ldots$, $_2P_{(m-1)}$, $_2P_m$ may be the average of luminance values corresponding to five neighboring cells among the cells $P_1, P_2, \ldots, P_{(n-1)}, P_n$.

In this case, data values corresponding to two left unit cells $a_1$, $a_2$ and two right unit cells $b_2$, $b_1$ may not be taken as the second data. The data values corresponding to the unit cells $a_1$, $b_1$ may respectively be the average of three first data values, and the data values corresponding to the unit cells $a_2$, $b_2$ may respectively be the average of four first data values. When these data values are not calculated as the second data, it is possible to prevent erroneous luminance evaluation due to low first data values in an edge area.

Figure 5:
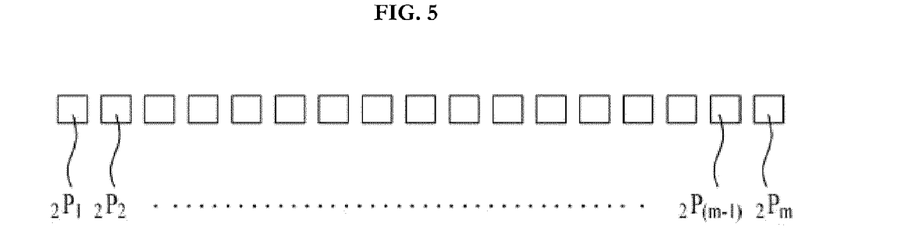
FIG. 5 is a view showing arrangement of the second data.

FIG. 5 is a view showing arrangement of the second data.

The second data includes average luminance values corresponding to the respective unit cells $_2P_1, _2P_2, \ldots, _2P_{(m-1)}, _2P_m$. Here, the average luminance values mean that the second data is an average value of the first data including luminance values of the neighboring cells $P_1, P_2, \ldots P_{(n-1)}, P_n$.

Figure 6:
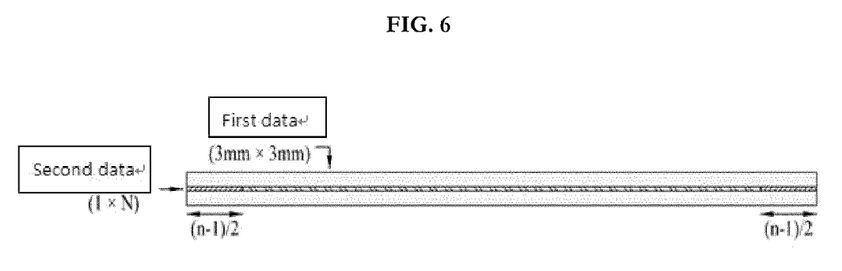
FIG. 6 is a view showing a relationship between the first data and the second data.

FIG. 6 is a view showing a relationship between the first data and the second data.

Assuming that the first data includes luminance values corresponding to areas each having a horizontal length and vertical length of 3 mm, the second data is an average value of the first data corresponding to neighboring areas, and values among the second data corresponding to some left and right areas n−½ may be neglected.

Then, a moving average $M_a$ of the second data is calculated. The moving average $M_a$ may be the average of the second data including the average luminance values corresponding to the respective unit cells $_2P_1, _2P_2, \ldots, _2P_{(n-1)}, _2P_m$.

Upon calculation of the moving average $M_a$, the number of the unit cells $_2P_1, _2P_2, \ldots, _2P_{(n-1)}, _2P_m$ may be referred to as a moving average data number. The moving average data number may be an odd number. When the moving average data number is an even number, the second data may include the average luminance corresponding to each of unit cells that are greater in number than the moving average data number by one. The moving average data number may vary based on the length of a sample, i.e. the length of the measured light source. The moving average data number may be a value acquired by dividing the length of the sample by 25.

Then, a ripple factor RF is calculated from the above described moving average. The ripple factor RF may be defined by the following Equation 1.

$$RF=(D_{raw}-M_a)/M_a \quad \text{Equation 1}$$

That is, the ripple factor RF may indicate a difference between each $D_{raw}$ and the moving average M, and $D_{raw}$ may be the second data including the average luminance values corresponding to the respective unit cells.

The ripple factor RF corresponding to each unit cell may be greater than or equal to the moving average M, or may be less than the moving average $M_a$.

The ripple factor RF as described above may indicate how much luminance of each unit cell differs from the moving average $M_a$. However, because the ripple factor has a positive value or a negative value, averaging ripple factors of respective unit cells included in a lighting apparatus may cause offset between the positive value and the negative value, which may make it difficult to determine whether or not the entire lighting apparatus has luminance uniformity.

Accordingly, a difference between luminance of each unit cell and the moving average $M_a$ may be checked by calculating a deviation of the above-described ripple factor RF, and consequently luminance uniformity of the lighting apparatus may be checked.

The ripple factor's deviation may be calculated from the following Equation 2.

$$VRF=VAR[(D_{raw}-M_a)/M_a] \quad \text{Equation 2}$$

VRF is the ripple factor's deviation. As described above, the average of differences between each $D_{raw}$ and the moving average $M_a$ is calculated, and upon this calculation, it is not considered whether or not each $D_{raw}$ is greater or less than the moving average $M_a$.

Figure 7A:
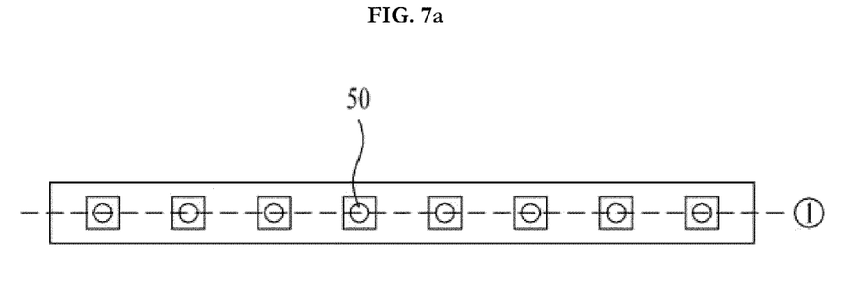
FIG. 7A is a view showing acquisition of first data from light emitting devices disposed in a single line.
Figure 7B:
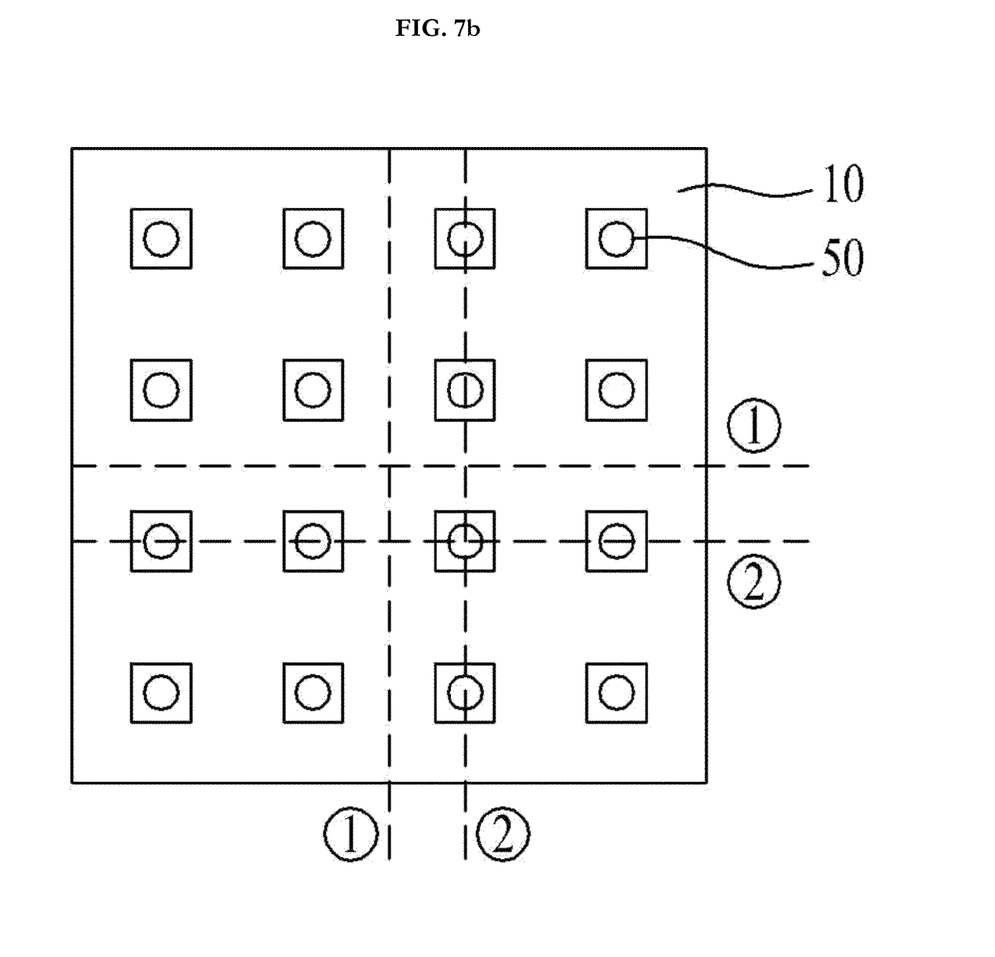
FIG. 7B is a view showing acquisition of first data from light emitting devices disposed in plural lines.

FIG. 7A is a view showing acquisition of first data from light emitting devices disposed in a single line, and FIG. 7B is a view showing acquisition of first data from light emitting devices disposed in plural lines.

As exemplarily shown in FIG. 7A, when the lighting apparatus or the light source includes the plural light emitting devices 50 disposed in a single line, measurement of the first data and calculation of the second data, the moving average, the ripple factor, and the ripple factor's deviation may be implemented after measuring luminance of the plural light emitting devices 50 corresponding to the single line.

As exemplarily shown in FIG. 7B, when the lighting apparatus or the light source includes the plural light emitting devices 50 disposed in multiple lines, measurement of the first data and calculation of the second data, the moving average, the ripple factor, and the ripple factor's deviation may be implemented once after measuring luminance of the plural light emitting devices corresponding to a first line, and thereafter may again be implemented once after measuring luminance of an area between the first line and a second line next to the first line.

That is, in FIG. 7B, luminance uniformity with regard to the light emitting devices 50 corresponding to the first line ② may be measured, and luminance uniformity with regard to the area between the first line ② and the second line ① may be measured.

Although the lighting apparatus as exemplarily shown in FIG. 7A includes the light emitting devices disposed in a single line, and thus luminance uniformity of the lighting apparatus may be determined based on an area corresponding to the light emitting devices, in the case of the lighting apparatus as exemplarily shown in FIG. 7B in which the light emitting devices are disposed in multiple lines, luminance uniformity is determined based on an area corresponding to the light emitting devices as well as an area between the light emitting devices.

Assuming an array of light emitting devices on a board, luminance uniformity of the entire lighting apparatus may be acquired when the above-described ripple factor's deviation becomes minimum.

Figure 8A:
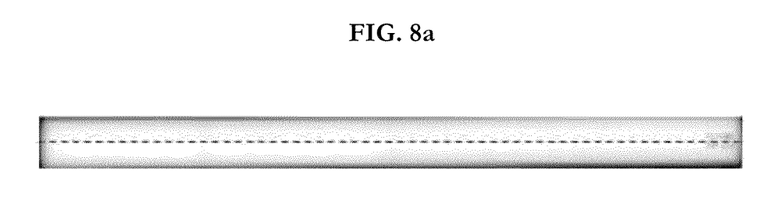
Figure 8B:
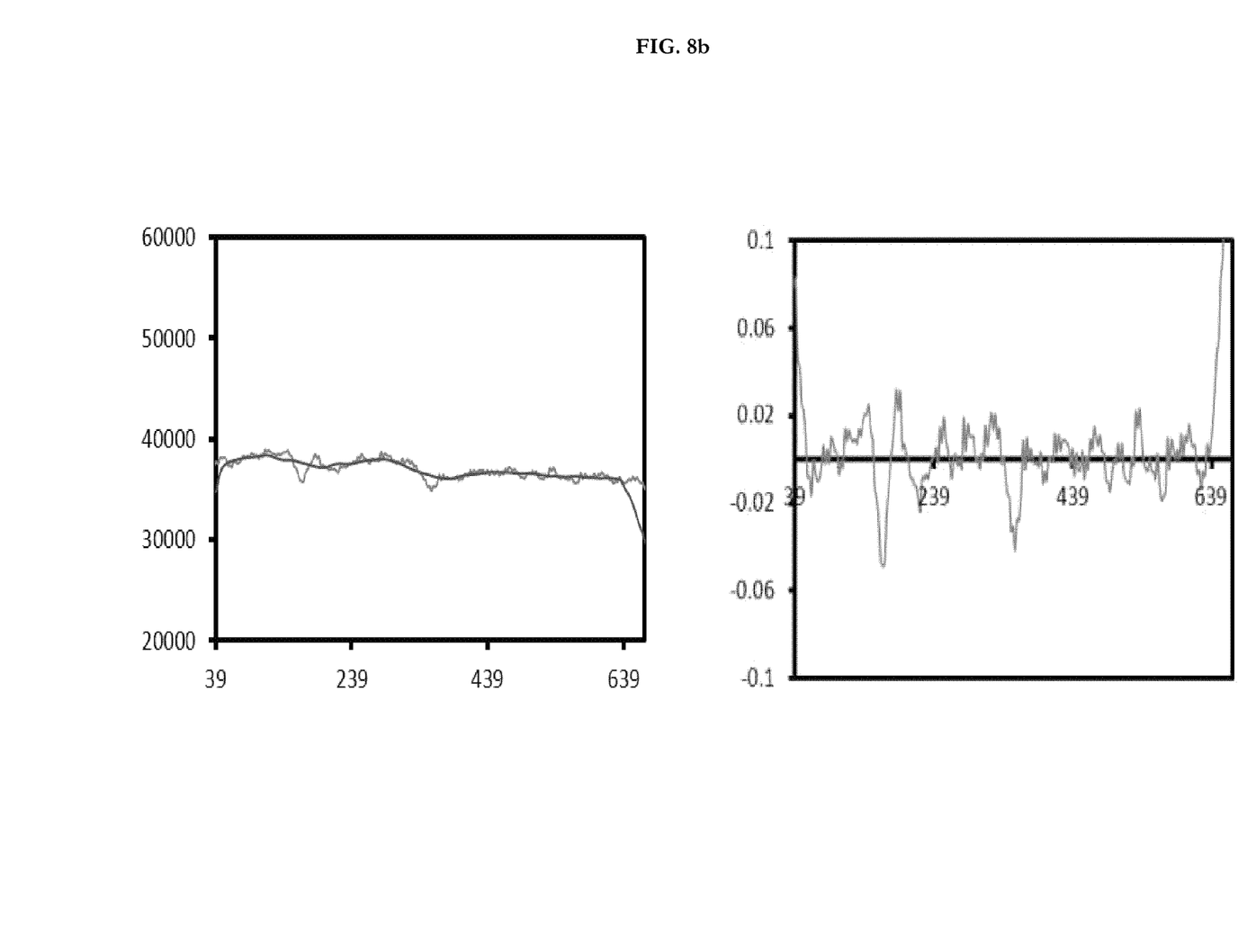
Figure 9A:
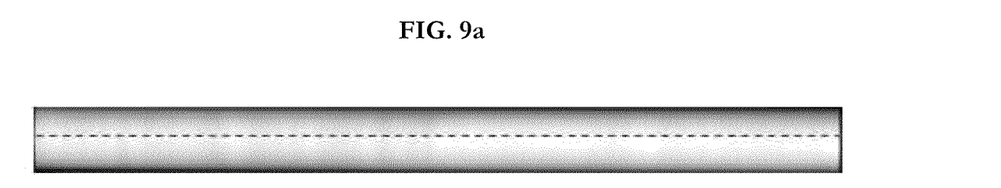
Figure 9B:
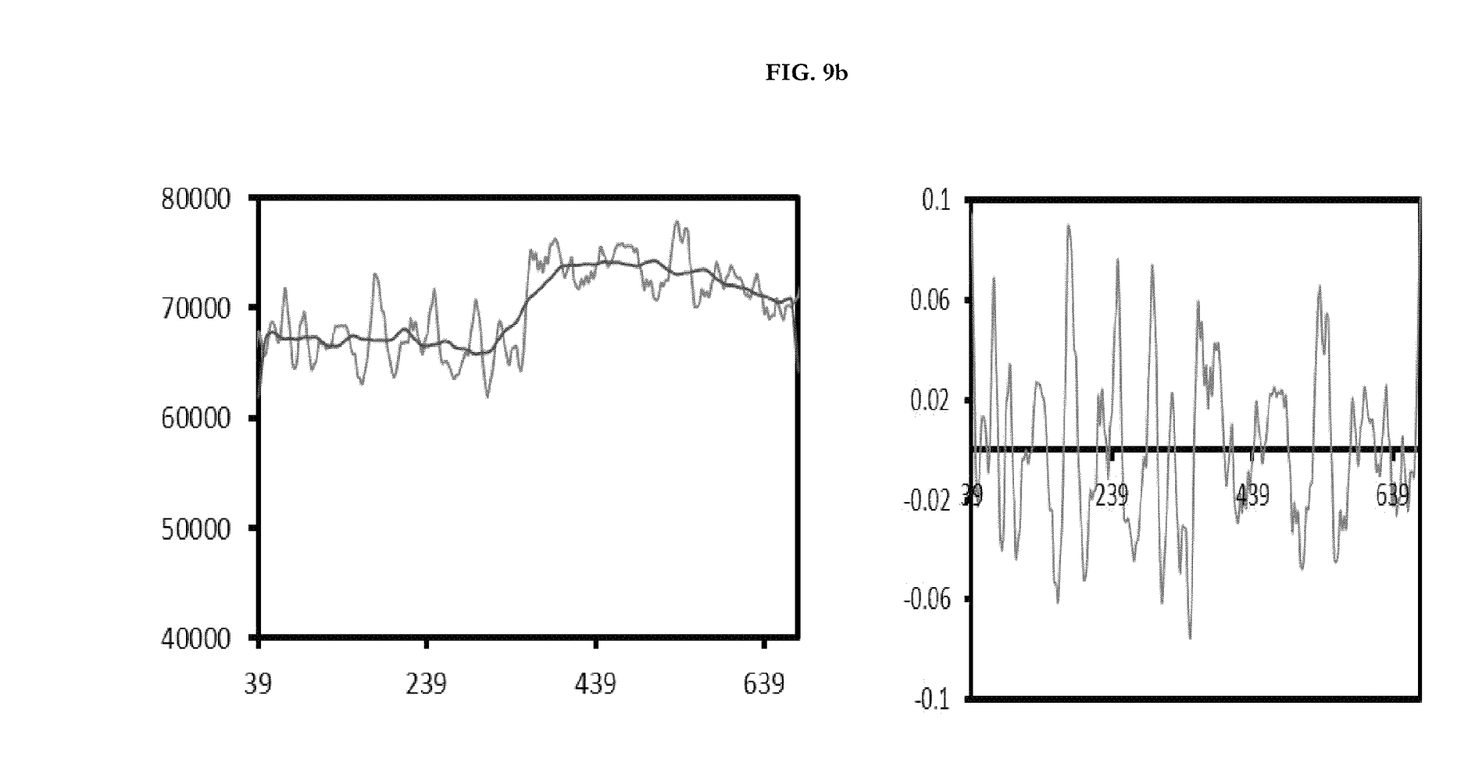
Figure 10A:
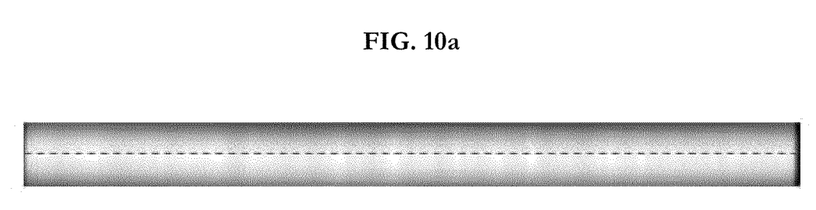
Figure 10B:
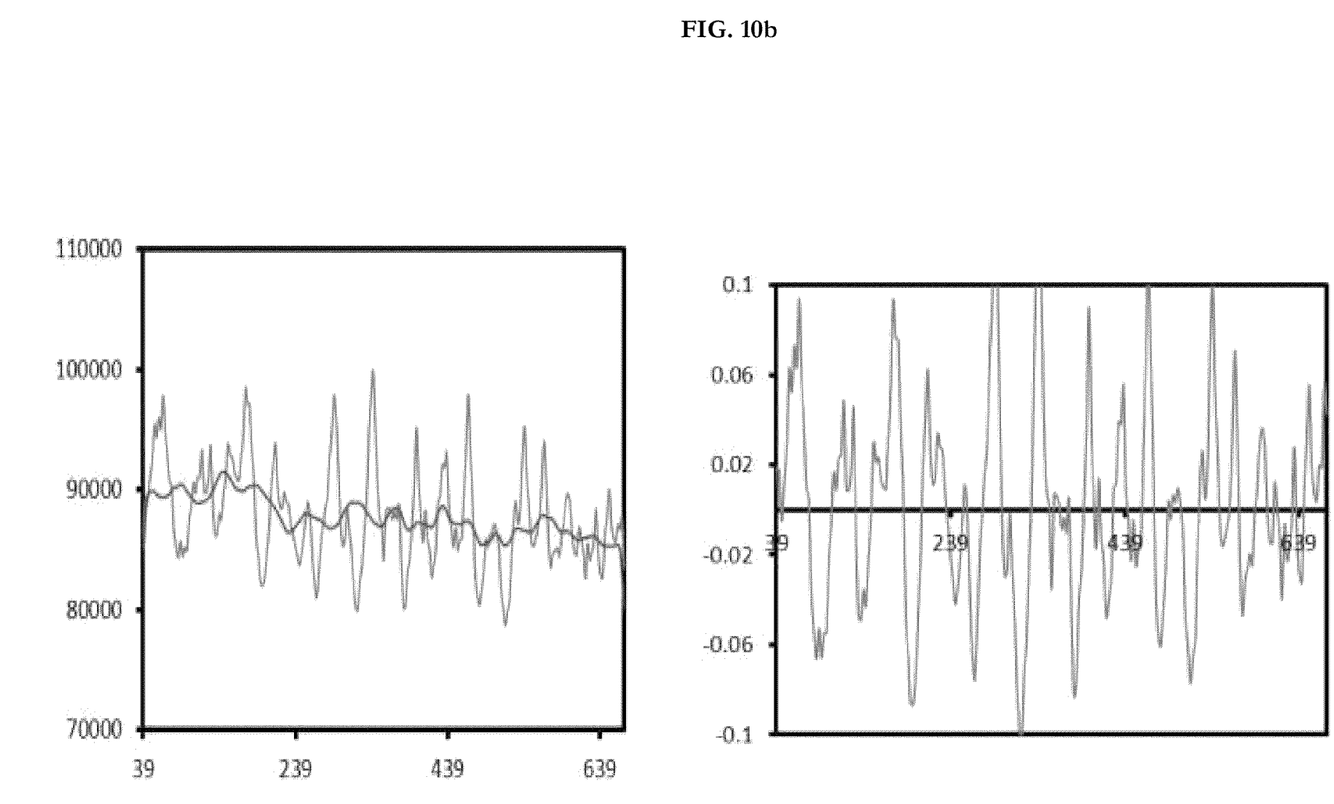
Figure 11A:
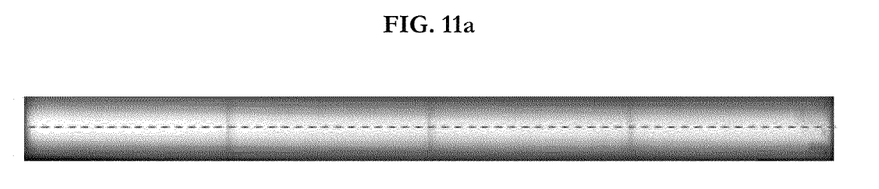
Figure 11B:
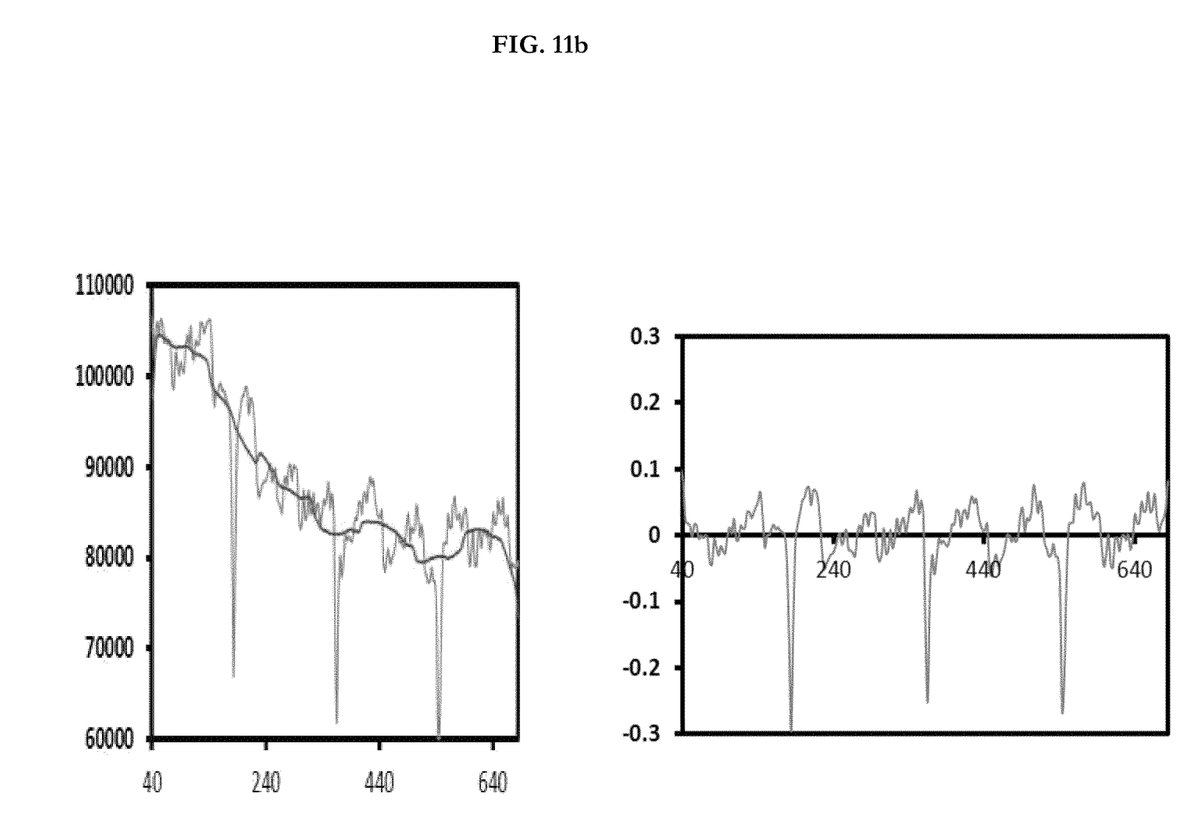
Figure 12A:
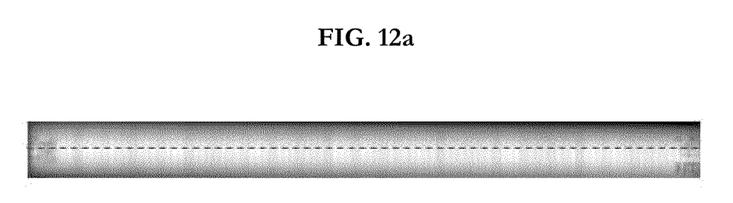
Figure 12B:
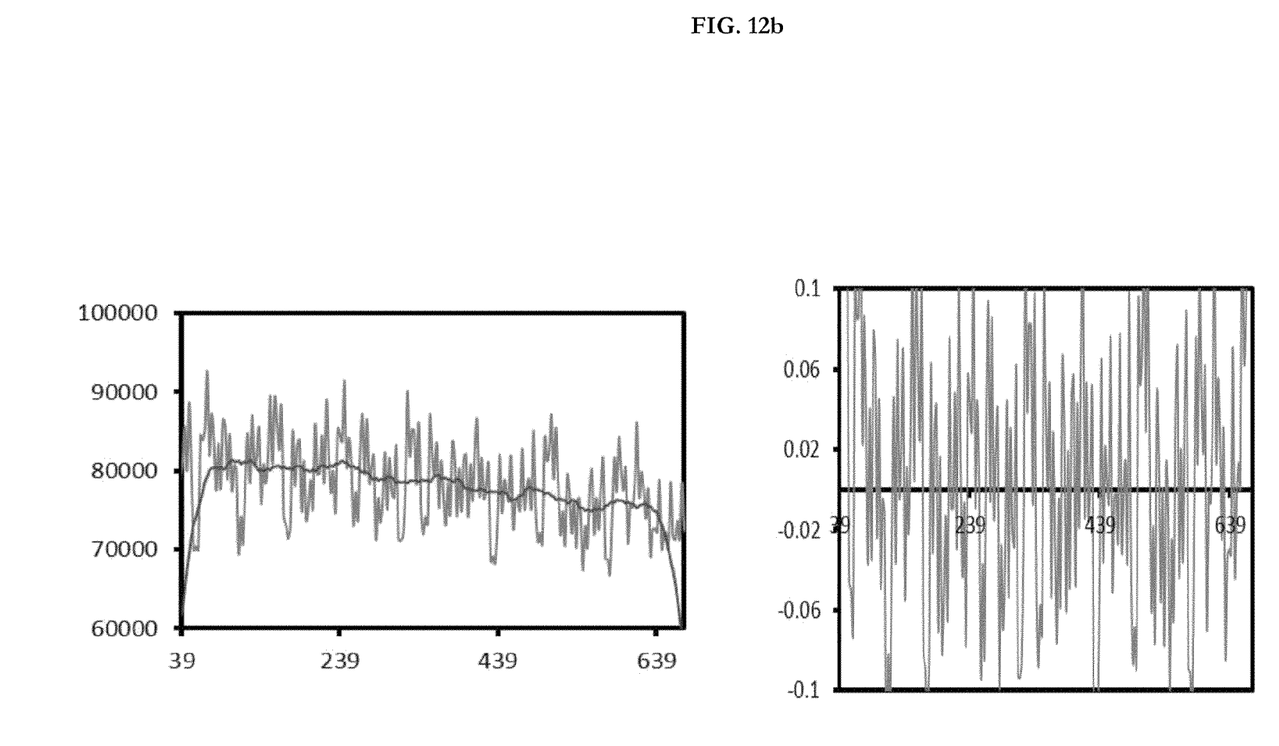

The following table 1 shows numerical values related to luminance of five lighting apparatuses, FIG. 8A shows luminance distribution before data measurement of Example 1 and FIG. 8B shows measured luminance distribution data, the moving average (red), and the ripple factor of Example 1, FIG. 9A shows luminance distribution before data measurement of Example 2 and FIG. 9B shows measured luminance distribution data, the moving average (red), and the ripple factor of Example 2, FIG. 10A shows luminance distribution before data measurement of Example 3 and FIG. 10B shows measured luminance distribution data, the moving average (red), and the ripple factor of Example 3, FIG. 11A shows luminance distribution before data measurement of Example 4 and FIG. 11B shows measured luminance distribution data, the moving average (red), and the ripple factor of Example 4, and FIG. 12A shows luminance distribution before data measurement of Example 5 and FIG. 12B shows measured luminance distribution data, the moving average (red), and the ripple factor of Example 5.

TABLE 1

|  | Example 1 | Example 2 | Example 3 | Example 4 | Example 5 |
| --- | --- | --- | --- | --- | --- |
| MIN/MAX | 0.895 | 0.796 | 0.789 | 0.554 | 0.721 |
| AVG/MAX | 0.950 | 0.899 | 0.880 | 0.829 | 0.845 |
| MIN/MAX | 0.942 | 0.885 | 0.896 | 0.669 | 0.853 |
| VRF | 0.774 | 1.059 | 1.979 | 2.637 | 6.263 |

Among Example 1 to Example 5, MIN is the minimum value of luminance, MAX is the maximum value of luminance, AVG is the average luminance value, and VRF is the ripple factor's deviation. VRF is a numerical value acquired by multiplying a value disclosed in each Example by $10^{-3}$.

It will be appreciated from Table 1 and FIGS. 8A to 12B that Example 1 having the smallest VRF has the most uniform luminance distribution and Example 5 having the greatest VRF has luminance distribution having the greatest deviation.

As is apparent from the above description, in a method of evaluating luminance of a light source and a lighting apparatus according to the present embodiment, luminance uniformity of the lighting apparatus may be measured by acquiring luminance data within the lighting apparatus and acquiring a moving average, a ripple factor, and a ripple factor's deviation in sequence. That is, through provision of the ripple factor's deviation VRF, uniformity of luminance distribution in each area within a light source of the lighting apparatus may be quantitatively determined. In addition, it may be possible to eliminate the effect of low luminance in an edge area by removing data regarding the edge area upon conversion from the first data to the second data.

Embodiments are provided to achieve luminance uniformity of a lighting apparatus via determination of luminance uniformity in the overall area of the lighting apparatus.

In one embodiment, a method of evaluating luminance of a light source, includes acquiring first data including a plurality of luminance values by measuring luminance of the light source, converting the first data into second data corresponding to a plurality of unit cells, acquiring a moving average of the second data, and acquiring a ripple factor, wherein the ripple factor is represented by $(D_{raw}-M_a)/M_a$, where $D_{raw}$ is the second data and $M_a$ is the moving average.

The method of evaluating luminance of the light source may further include acquiring a deviation of the ripple factor.

The acquiring the first data may include measuring luminance of the light source corresponding to a plurality of areas each having a horizontal length and vertical length of 3 mm.

The second data may include average values of the first data corresponding to the unit cells.

The measuring luminance of the light source may include measuring luminance of a central area of the light source.

The acquiring the moving average may include the average of the second data equal in number to a moving average data number.

The average of the second data greater in number than the moving average data number by one may be acquired when the moving average data number is an even number.

The light source may include a plurality of light emitting devices disposed in a single line.

The acquiring the first data may include measuring luminance of the light emitting devices disposed in the single line.

The light source may include a plurality of light emitting devices disposed in multiple lines, and the acquiring the first data may include measuring luminance of the light emitting devices disposed in a first line and measuring luminance of an area between the first line and a second line next to the first line.

The converting may include removing the first data regarding an edge area of the light source.

In accordance with another embodiment, a lighting apparatus includes a board, and an array of light emitting devices disposed in at least one line on the board, wherein the array of light emitting devices is disposed such that a deviation of a ripple factor becomes minimum.

For example, various variations and modifications are possible in the component parts of the embodiment described in detail. In addition, differences related to these variations and modifications should be construed as being include in the scope of the disclosure as defined in the accompanying claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of evaluating luminance of a light source, the method comprising:

acquiring first data including a plurality of luminance values by measuring luminance of the light source;
    converting the first data into second data corresponding to a plurality of unit cells;
    acquiring a moving average of the second data; and
    acquiring a ripple factor and a deviation of the ripple factor,
    wherein the second data includes average values of the first data corresponding to the unit cells, and the ripple factor is represented by $(D_{raw}-Ma_a)/M_a$, where $D_{raw}$ is the second data and $M_a$ is the moving average,
    wherein the moving average is obtained by acquiring first data including a plurality of luminance values by measuring luminance of light emitting devices, converting the first data into second data corresponding to a plurality of unit cells, and acquiring a moving average of the second data,
    wherein measuring luminance of the light emitting devices includes measuring luminance of a central area of the light emitting devices,
    wherein the luminance values of the first data corresponding to plural neighboring cells is averaged, and the resulting average values are set to second data corresponding to the unit cells,
    wherein each of the unit cells has a horizontal length and vertical length, and
    wherein the moving average is an average of the second data equal in number to a moving average data number.

2. The method according to claim 1, wherein the acquiring the first data includes measuring luminance of the light source corresponding to a plurality of areas each having a horizontal length and vertical length of 3 mm.

3. The method according to claim 1, wherein an average of the second data greater in number than the moving average data number by one is acquired when the moving average data number is an even number.

4. The method according to claim 1, wherein the light source includes a plurality of light emitting devices disposed in a single line.

5. The method according to claim 1, wherein the light source includes a plurality of light emitting devices disposed in multiple lines.

6. The method according to claim 1, wherein the converting includes removing the first data regarding an edge area of the light source.

7. The method according to claim 1, wherein the second data includes average luminance values corresponding to the respective unit cells, and the average luminance values are average values of the first data including luminance values of the neighboring cells.

8. The method according to claim 4, wherein the acquiring the first data includes measuring luminance of the light emitting devices disposed in the single line.

9. The method according to claim 5, wherein the acquiring the first data includes measuring luminance of the light emitting devices disposed in a first line and measuring luminance of an area between the first line and a second line next to the first line.

10. A lighting apparatus comprising:
    a board; and
    an array of light emitting devices provided in at least one line on the board,
    wherein the array of light emitting devices is provided such that a deviation of a ripple factor is reduced (here, the ripple factor being represented by $(D_{raw}-M_a)/M_a$, where $D_{raw}$ is second data, and $M_a$ is a moving average),
    wherein the moving average is obtained by acquiring first data including a plurality of luminance values by measuring luminance of the light emitting devices, converting the first data into second data corresponding to a plurality of unit cells, and acquiring a moving average of the second data, wherein measuring luminance of the light emitting devices includes measuring luminance of a central area of the light emitting devices, wherein the luminance values of the first data corresponding to plural neighboring cells is averaged, and the resulting average values are set to second data corresponding to the unit cells, wherein each of the unit cells has a horizontal length and vertical length, and wherein the moving average is an average of the second data equal in number to a moving average data number.

11. The lighting apparatus according to claim 10, wherein the board is a printed circuit board.

12. The light apparatus according to claim 10, wherein each of the unit cells has a horizontal length of 3 mm and a vertical length of 3 mm.

13. The lighting apparatus according to claim 10, wherein the second data includes average values of the first data corresponding to the unit cells.

14. The lighting apparatus according to claim 10, wherein an average of the second data is greater in number than the moving average data number by one is acquired when the moving average data number is an even number.

15. The lighting apparatus according to claim 10, wherein the light emitting devices are disposed in a single line, and the first data is acquired by measuring luminance of the light emitting devices disposed in the single line.

16. The lighting apparatus according to claim 10, wherein the light emitting devices are disposed in multiple lines, and the first data are acquired by measuring luminance of the light emitting devices disposed in a first line and measuring luminance of an area between the first line and a second line next to the first line.

17. The lighting apparatus according to claim 10, wherein the converting the first data into second data includes removing the first data regarding an edge area of the light emitting devices.

18. The lighting apparatus according to claim 10, wherein the light emitting devices include light emitting diodes.

19. The lighting apparatus according to claim 10, wherein the second data includes average luminance values corresponding to the respective unit cells, and the average luminance values are average values of the first data including luminance values of the neighboring cells.

20. The lighting apparatus according to claim 10, wherein the deviation of the ripple factor is an average of differences between each of the second data and the moving average.

* * * * *